W. DEATHERAGE.
Hog-Trap.
No. 167,440. Patented Sept. 7, 1875.
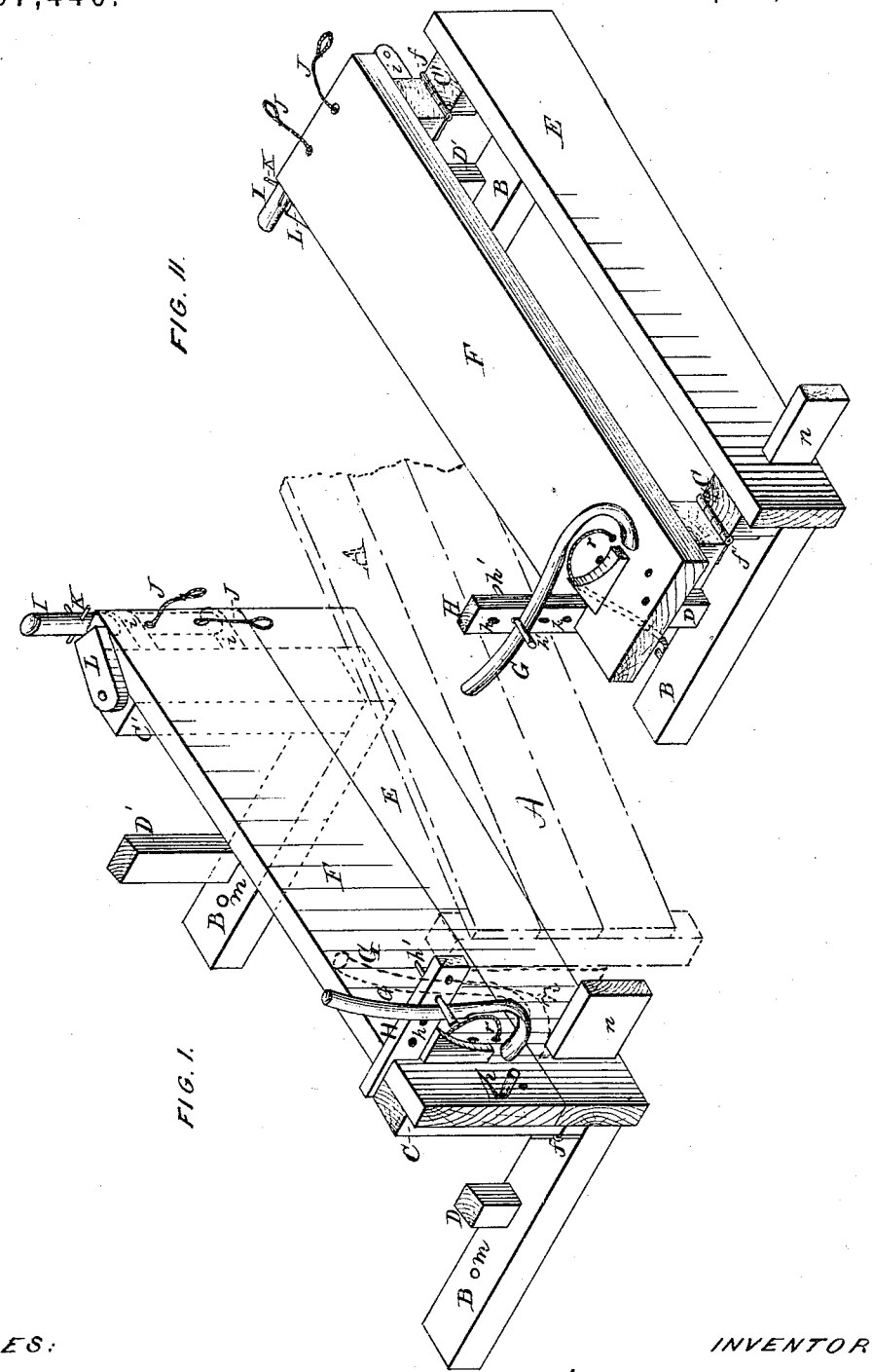
WITNESSES:
A. McCallum
D. G. Stuart
INVENTOR:
Washington Deatherage
By W. B. Richards,
Atty.

UNITED STATES PATENT OFFICE.

WASHINGTON DEATHERAGE, OF GALESBURG, ILLINOIS.

IMPROVEMENT IN HOG-TRAPS.

Specification forming part of Letters Patent No. 167,440, dated September 7, 1875; application filed January 4, 1875.

*To all whom it may concern:*

Be it known that I, WASHINGTON DEATHERAGE, of Galesburg, county of Knox and State of Illinois, have invented certain Improvements in Hog-Traps, of which the following is a specification:

The object of my invention is to facilitate the operation of catching and holding hogs while they are being ringed or marked, and for holding them securely and in favorable position for being spayed or castrated.

The invention consists in a new and improved combination of devices for securing the animal's head and hind parts to a hinged board, which may be turned down into convenient position for operating on the animal, all as hereinafter more fully set forth.

The accompanying drawing illustrates my invention and forms part of this specification, Figure 1 being a perspective representation thereof, and showing the hinged side in an upright position, and Fig. 2 is a perspective view thereof, with the side shown turned down.

Referring to the parts by letters, letter A represents a short section of ordinary fence, a portion of a hog sty, or pen. B B are sills, to the ends of which are framed the short upright posts C C', and to their central parts the uprights D D'. E is a side board secured to the posts C C'. F is a side board hinged to the board E, or to the posts C C', by hinges f f. G is a clamp or spring bar, formed as shown in the drawing, and its lower end attached to and near one end, and the lower edge of the board F. H is a bar attached to to the board F, and extending inward in proximity to the clamp G, and is pierced with holes h for the reception of a pin, h'. I is a windlass, provided with suitable bearings i at the other end of the board F. J J are cords attached at one end to the windlass I, and their other ends formed into loops, as shown, for ready attachment to the hog's legs. K K are arms, and L is a button, by means of which the windlass I may be locked in the obvious manner, and as shown in the drawings.

In operation the device is set up near the side of the fence A, with its rear end somewhat the farthest therefrom, and staked in position by driven stakes m. The clamp G, being in the position shown by dotted lines at Fig. 1, and a board, n, being placed in the bottom of the space between the board E and the fence, and immediately under the clamp G, the hog, in seeking to pass through, will insert his head over the lower end of the clamp G, and between it and the board F, when the upper end of the clamp G may be drawn over to seize the animal's neck, and be secured by inserting the pin h' in the bar H, in rear of the bar G, as shown by full lines at Fig. 1. The pin p may now be inserted above its nose, to hold it secure from moving while it may be marked, ringed in the nose, &c. If it is desired to spay the animal, the looped ends of the cords J J may be secured to its hind legs, and the windlass then turned to tighten up said cords, which may then be locked by the button L and arms K. The animal, it will be seen, will now be attached to the board F, which may be turned down on its hinges and rest on the posts D D', as shown at Fig. 2, thus bringing the animal over on its side and into favorable position for being spayed or otherwise operated upon. The animal may be released by a reverse process, and the trap again set for another.

The post C' should be somewhat higher than the post C, as the hind legs are longer than the front legs. The parts constituting the trap proper may, when in the folded position shown at Fig. 2, be conveniently loaded in a wagon for transportation or shipment. A cord, r, may be used to substitute the clamp G. It can be operated in the obvious manner, and when the trap is turned down may be secured to a pin, s, as shown at Fig. 2.

I claim as new—

The combination of the boards E F, clamp G, and cords J J, operating substantially as and for the purpose specified.

WASHINGTON DEATHERAGE.

Witnesses:
W. B. RICHARDS,
J. J. TUNNICLIFF.